(12) United States Patent
Michel et al.

(10) Patent No.: US 12,371,195 B2
(45) Date of Patent: Jul. 29, 2025

(54) VEHICLE CAPTURE ASSEMBLIES AND RELATED DEVICES, SYSTEMS, AND METHODS

(71) Applicant: Northrop Grumman Systems Corporation, Plymouth, MN (US)

(72) Inventors: Matthew Alan Michel, Oak Hill, VA (US); Michael Alfred Tosto, Springfield, VA (US); Kevin David Tebbe, Alexandria, VA (US); Daisaku Inoyama, Great Falls, VA (US); John Francis Papayanopoulos, West Orange, NJ (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1006 days.

(21) Appl. No.: 17/207,646

(22) Filed: Mar. 20, 2021

(65) Prior Publication Data
US 2021/0339893 A1 Nov. 4, 2021

Related U.S. Application Data

(60) Provisional application No. 63/019,923, filed on May 4, 2020.

(51) Int. Cl.
*B64G 1/64* (2006.01)
(52) U.S. Cl.
CPC ............. *B64G 1/646* (2013.01); *B64G 1/645* (2013.01)

(58) Field of Classification Search
CPC .......... B64G 1/646; B64G 1/645; B64G 1/64
See application file for complete search history.

(56) References Cited

U.S. PATENT DOCUMENTS

| | | |
|---|---|---|
| 3,268,091 A | 8/1966 | Melton |
| 3,508,723 A | 4/1970 | Warren et al. |
| 3,662,973 A | 5/1972 | Collins |
| 4,177,964 A | 12/1979 | Hujsak et al. |
| 4,219,171 A | 8/1980 | Rudmann |
| 4,298,178 A | 11/1981 | Hujsak |
| 4,381,092 A | 4/1983 | Barker |
| 4,391,423 A | 7/1983 | Pruett et al. |
| 4,431,333 A | 2/1984 | Chandler |
| 4,449,684 A | 5/1984 | Hinds |
| 4,588,150 A | 5/1986 | Bock et al. |
| 4,657,211 A | 4/1987 | Fuldner et al. |
| 4,664,344 A | 5/1987 | Harwell et al. |

(Continued)

FOREIGN PATENT DOCUMENTS

| | | |
|---|---|---|
| CN | 104071357 B | 4/2016 |
| EP | 0204047 A1 | 12/1986 |

(Continued)

OTHER PUBLICATIONS

International PCT Application No. PCT/US2021/023371, International Search Report and Written Opinion, Jun. 24, 2021, 11 pp.

(Continued)

*Primary Examiner* — Elias Desta
(74) *Attorney, Agent, or Firm* — BKRIP LLC

(57) ABSTRACT

Vehicle capture assemblies and related devices, systems, and methods include one or more probe assemblies for passively engaging with and securing the target vehicle.

31 Claims, 8 Drawing Sheets

(56) References Cited

U.S. PATENT DOCUMENTS

| | | |
|---|---|---|
| 4,709,454 A * | 12/1987 | Barnes .................... F16B 21/16 403/322.2 |
| 4,750,692 A | 6/1988 | Howard |
| 4,880,187 A | 11/1989 | Rourke et al. |
| 4,898,348 A | 2/1990 | Kahn |
| 4,955,559 A | 9/1990 | Kaminskas |
| 5,005,786 A | 4/1991 | Okamoto et al. |
| 5,040,749 A | 8/1991 | Johnson |
| 5,094,410 A | 3/1992 | Johnson |
| 5,104,070 A | 4/1992 | Johnson et al. |
| 5,125,601 A | 6/1992 | Monford, Jr. |
| 5,169,094 A | 12/1992 | Maute et al. |
| 5,299,764 A | 4/1994 | Scott |
| 5,349,532 A | 9/1994 | Tilley et al. |
| 5,364,046 A | 11/1994 | Dobbs et al. |
| 5,372,340 A | 12/1994 | Ihara et al. |
| 5,449,211 A | 9/1995 | Monford, Jr. |
| 5,490,075 A | 2/1996 | Howard et al. |
| 5,511,748 A | 4/1996 | Scott |
| 5,735,488 A | 4/1998 | Schneider |
| 5,803,407 A | 9/1998 | Scott |
| 5,806,802 A | 9/1998 | Scott |
| 5,813,632 A | 9/1998 | Taylor |
| 6,017,000 A | 1/2000 | Scott |
| 6,032,904 A | 3/2000 | Hosick et al. |
| 6,045,094 A | 4/2000 | Rivera |
| 6,082,678 A | 7/2000 | Maute |
| 6,264,145 B1 | 7/2001 | Maute |
| 6,272,751 B1 | 8/2001 | McMeekin |
| 6,275,751 B1 | 8/2001 | Stallard et al. |
| 6,296,207 B1 | 10/2001 | Tilley et al. |
| 6,299,107 B1 | 10/2001 | Kong et al. |
| 6,322,023 B1 | 11/2001 | Soranno et al. |
| 6,330,987 B1 | 12/2001 | Scott |
| 6,354,540 B1 | 3/2002 | Lewis et al. |
| 6,378,810 B1 | 4/2002 | Pham et al. |
| 6,484,973 B1 | 11/2002 | Scott |
| 6,523,784 B2 | 2/2003 | Steinsiek et al. |
| 6,565,043 B1 | 5/2003 | Wittmann |
| 6,669,148 B2 | 12/2003 | Anderman et al. |
| 6,742,745 B2 | 6/2004 | Tchoryk et al. |
| 6,840,481 B1 | 1/2005 | Gurevich |
| 6,843,446 B2 | 1/2005 | Scott |
| 6,845,303 B1 | 1/2005 | Byler |
| 6,866,232 B1 | 3/2005 | Finney |
| 6,945,500 B2 | 9/2005 | Wingo |
| 6,969,030 B1 | 11/2005 | Jones et al. |
| 7,070,151 B2 | 7/2006 | D et al. |
| 7,104,505 B2 | 9/2006 | Tchoryk et al. |
| 7,118,075 B2 | 10/2006 | Schubert |
| 7,163,179 B1 | 1/2007 | Taylor |
| 7,207,525 B2 | 4/2007 | Bischof et al. |
| 7,216,833 B2 | 5/2007 | D et al. |
| 7,216,834 B2 | 5/2007 | D et al. |
| 7,240,879 B1 | 7/2007 | Cepollina et al. |
| 7,293,743 B2 | 11/2007 | Cepollina et al. |
| 7,370,834 B2 | 5/2008 | Scott |
| 7,438,264 B2 | 10/2008 | Cepollina et al. |
| 7,461,818 B2 | 12/2008 | D et al. |
| 7,484,690 B2 | 2/2009 | D et al. |
| 7,513,459 B2 | 4/2009 | Cepollina et al. |
| 7,513,460 B2 | 4/2009 | Cepollina et al. |
| 7,575,199 B2 | 8/2009 | D et al. |
| 7,575,200 B2 | 8/2009 | Behrens et al. |
| 7,588,213 B2 | 9/2009 | D et al. |
| 7,611,096 B2 | 11/2009 | D et al. |
| 7,611,097 B2 | 11/2009 | D et al. |
| 7,624,950 B2 | 12/2009 | D et al. |
| 7,815,149 B1 | 10/2010 | Howard et al. |
| 7,823,837 B2 | 11/2010 | Behrens et al. |
| 7,828,249 B2 | 11/2010 | Ritter et al. |
| 7,857,261 B2 | 12/2010 | Tchoryk et al. |
| 7,861,974 B2 | 1/2011 | Hays et al. |
| 7,861,975 B2 | 1/2011 | Behrens et al. |
| 7,992,824 B2 | 8/2011 | Tchoryk et al. |
| 8,006,937 B1 | 8/2011 | Romano et al. |
| 8,006,938 B2 | 8/2011 | Behrens et al. |
| 8,016,242 B2 | 9/2011 | Baumann |
| 8,052,092 B2 | 11/2011 | Atmur et al. |
| 8,056,864 B2 | 11/2011 | Hays et al. |
| 8,074,935 B2 | 12/2011 | Gryniewski et al. |
| 8,181,911 B1 | 5/2012 | Gryniewski et al. |
| 8,196,870 B2 | 6/2012 | Gryniewski et al. |
| 8,205,838 B2 | 6/2012 | Moorer et al. |
| 8,226,046 B2 | 7/2012 | Poulos |
| 8,240,613 B2 | 8/2012 | Ritter et al. |
| 8,245,370 B2 | 8/2012 | Ritter et al. |
| 8,333,347 B2 | 12/2012 | Ritter et al. |
| 8,412,391 B2 | 4/2013 | Paluszek et al. |
| 8,448,904 B2 | 5/2013 | Gryniewski et al. |
| 8,628,044 B2 | 1/2014 | Poulos |
| 8,899,527 B2 | 12/2014 | Allen et al. |
| 9,108,747 B2 | 8/2015 | Roberts et al. |
| 9,284,073 B2 | 3/2016 | Bigelow |
| 9,302,793 B2 | 4/2016 | Ghofranian et al. |
| 9,321,175 B2 | 4/2016 | Smith |
| 9,399,295 B2 | 7/2016 | Roberts et al. |
| 9,434,485 B1 | 9/2016 | Lehocki |
| 9,463,883 B2 | 10/2016 | Bigelow |
| 9,527,607 B2 | 12/2016 | Celerier |
| 9,573,703 B2 | 2/2017 | Celerier |
| 9,809,327 B2 | 11/2017 | Rossettini et al. |
| 9,878,806 B2 | 1/2018 | Helmer et al. |
| 9,914,550 B1 | 3/2018 | Price et al. |
| 9,950,424 B2 | 4/2018 | Roberts et al. |
| 10,005,180 B2 | 6/2018 | Roberts et al. |
| 10,407,184 B2 | 9/2019 | Mori et al. |
| 10,577,130 B1 | 3/2020 | Parish et al. |
| 2001/0017337 A1 | 8/2001 | Holemans |
| 2002/0063188 A1 | 5/2002 | Steinsiek et al. |
| 2003/0192995 A1 | 10/2003 | Tchoryk et al. |
| 2004/0026571 A1 | 2/2004 | Scott |
| 2004/0245404 A1 | 12/2004 | Kerstein |
| 2005/0001102 A1 | 1/2005 | Schubert |
| 2005/0040282 A1 | 2/2005 | Wingo |
| 2005/0103940 A1 * | 5/2005 | Bischof .................. B25J 18/025 244/172.4 |
| 2005/0258311 A1 | 11/2005 | Scott |
| 2006/0145023 A1 | 7/2006 | Babb et al. |
| 2006/0145024 A1 | 7/2006 | Kosmas |
| 2006/0151671 A1 | 7/2006 | Kosmas |
| 2007/0114334 A1 | 5/2007 | D et al. |
| 2007/0164164 A1 | 7/2007 | Cepollina et al. |
| 2007/0210212 A1 * | 9/2007 | Tchoryk, Jr. ........... B64G 1/646 244/172.4 |
| 2007/0228219 A1 | 10/2007 | Behrens et al. |
| 2007/0228220 A1 | 10/2007 | Behrens et al. |
| 2008/0060460 A1 | 3/2008 | Smith |
| 2008/0121759 A1 | 5/2008 | Behrens et al. |
| 2008/0237400 A1 | 10/2008 | Gryniewski et al. |
| 2008/0265098 A1 | 10/2008 | Connelly et al. |
| 2009/0001221 A1 | 1/2009 | Collyer |
| 2011/0121139 A1 | 5/2011 | Poulos |
| 2011/0180670 A1 | 7/2011 | D et al. |
| 2011/0192936 A1 | 8/2011 | Knirsch |
| 2012/0112009 A1 | 5/2012 | Gryniewski et al. |
| 2012/0286098 A1 | 11/2012 | Poulos |
| 2012/0325972 A1 | 12/2012 | Gryniewski et al. |
| 2013/0103193 A1 | 4/2013 | Roberts et al. |
| 2013/0292516 A1 | 11/2013 | Celerier |
| 2014/0027577 A1 | 1/2014 | Darooka |
| 2014/0361123 A1 | 12/2014 | Celerier |
| 2015/0008288 A1 | 1/2015 | Bigelow |
| 2015/0008290 A1 | 1/2015 | Bigelow |
| 2015/0053823 A1 | 2/2015 | Bigelow |
| 2015/0097084 A1 | 4/2015 | Szabo et al. |
| 2015/0314893 A1 | 11/2015 | Rembala et al. |
| 2016/0039543 A1 | 2/2016 | Roberts et al. |
| 2016/0039544 A1 | 2/2016 | Roberts et al. |
| 2016/0257435 A1 | 9/2016 | Coraboeuf et al. |
| 2017/0113818 A1 | 4/2017 | Mori et al. |
| 2017/0129627 A1 | 5/2017 | Moro et al. |
| 2017/0342943 A1 | 11/2017 | Watts |
| 2018/0087683 A1 | 3/2018 | Raven et al. |

(56) References Cited

U.S. PATENT DOCUMENTS

| | | |
|---|---|---|
| 2018/0118377 A1 | 5/2018 | Garber |
| 2018/0148197 A1 | 5/2018 | Halsband et al. |
| 2018/0178606 A1* | 6/2018 | Said ................. B63B 27/29 |
| 2018/0186476 A1 | 7/2018 | Poncet et al. |
| 2018/0251240 A1 | 9/2018 | Reitman et al. |
| 2018/0251242 A1 | 9/2018 | Gorakavi et al. |
| 2018/0297722 A1 | 10/2018 | Agathon-Burton et al. |
| 2018/0297723 A1* | 10/2018 | Sorensen ............. B64G 1/1078 |
| 2019/0023420 A1 | 1/2019 | Nicholson et al. |
| 2019/0023421 A1 | 1/2019 | Nicholson et al. |
| 2019/0023422 A1 | 1/2019 | Nicholson et al. |

FOREIGN PATENT DOCUMENTS

| | | |
|---|---|---|
| EP | 0541052 A1 | 5/1993 |
| EP | 0937644 A2 | 8/1999 |
| EP | 1516815 A1 | 3/2005 |
| EP | 2134606 A1 | 12/2009 |
| EP | 0741655 B2 | 5/2010 |
| EP | 1654159 B1 | 6/2010 |
| EP | 2522577 A1 | 11/2012 |
| EP | 3083406 B1 | 2/2017 |
| EP | 3156335 A1 | 4/2017 |
| EP | 3186151 A1 | 7/2017 |
| EP | 3248737 B1 | 12/2018 |
| JP | 01-282098 A | 11/1989 |
| JP | 02-182599 A | 7/1990 |
| JP | 2013-121126 A | 6/2013 |
| KR | 10-2000-004560 A | 7/2000 |
| KR | 10-1808553 B1 | 12/2017 |
| WO | 87/04992 A1 | 8/1987 |
| WO | 94/29927 A1 | 12/1994 |
| WO | 2005/110847 A1 | 11/2005 |
| WO | 2005/118394 A1 | 12/2005 |
| WO | 2008/109993 A1 | 9/2008 |
| WO | 2014/024199 A1 | 2/2014 |
| WO | 2015/190527 A1 | 12/2015 |
| WO | 2016/030890 A1 | 3/2016 |
| WO | 2016/181079 A1 | 11/2016 |

OTHER PUBLICATIONS

Weise et al., "An Intelligent Builging Blocks Concept for On-Orbit-Satellite Servcing", Turin, Italy, Sep. 4-6, 2-12, 8 pages.

Sellmaier et al., "On-Orbit Servicing Missions: Challenges and Solutions for Spacecraft Operations", SpaceOps 2010 Conference, AIAA 2010-2159, 2010.

Reintsema et al., "DEOS—The In-Flight Technology Demonstration of GERMAN'SROBOTICS Approach to Dispose Malfunctioned Satellites", 2010, 8 pages.

Mukherjee, "Robotic Assembly of Space Assets; Architectures and Technologies" Future In-Space Operations (FISO) Teleconference, Jun. 27, 2018, 2018 NASA Jet Propulsion Laboratory California Institute of Technology, 41 pages.

Medina et al., "Towards a standardized grasping and refuelling on-orbit servicing for geo spacecraft", Acta Astronautica, vol. 134, 2017, pp. 1-10.

IBOSS—a modular approach towards enhanced future space systems and flexibility, http://www.iboss-satellites.com/iboss/, http://exchange.ciros-engineering.com/download/public/iBOSS_IAC-2017.wmv.

Fehse "Automated Rendezvous and Docking of Spacecraft", 15 pages, Cambridge University Press 2003.

DLR, iBOSS—intelligent Building Blocks for On-Orbit Satellite Servicing and Assembly; German Aerospace Center (DLR)Space Administration, 2017, 2 pages.

\* cited by examiner

VEHICLE CAPTURE ASSEMBLIES AND RELATED DEVICES, SYSTEMS, AND METHODS

CROSS-REFERENCE TO RELATED APPLICATIONS

This application claims the benefit of the filing date of U.S. Provisional Patent Application Ser. No. 63/019,923, filed May 4, 2020, for "VEHICLE CAPTURE ASSEMBLIES AND RELATED DEVICES, SYSTEMS, AND METHODS," the disclosure of which is incorporated herein in its entirety by reference.

TECHNICAL FIELD

The present disclosure relates to systems, devices, assemblies, apparatus, and methods for vehicle (e.g., spacecraft) docking. In some embodiments, the present disclosure includes a primarily passive vehicle capture assembly for engaging with an associated vehicle and related devices, systems, and methods.

BACKGROUND

Docking assemblies and devices may be utilized to mechanically connect two or more vehicles (e.g., spacecraft) to each other. Such spacecraft may be vehicles (e.g., self-propelled vehicles) designed for short-term space flights and/or may be configured to remain in space for a long period of time. The spacecraft may be intended to perform a specific function in a space mission, such as supplying resources to and/or altering the orbit of a target vehicle. In some instances, the spacecraft may be a space station, satellite, or another suitable structure.

The connection of two or more spacecraft may enable the transfer of resources from one spacecraft to another spacecraft. For example, a spacecraft may dock with a space station to deliver crew and resources. In another example, a spacecraft may dock with a satellite to perform maintenance and repair of one or more components of that satellite. In yet an additional example, a spacecraft may dock with another vehicle to provide a specific mission function, such as, for example, propulsion for a descent to or an ascent from an astronomical body or to transfer to a select location for the mission.

Conceptualized methods of docking to spacecraft consist of complex mechanical implements. Various patents and publications have considered such methods, including U.S. Pat. Nos. 3,508,723, 4,018,409, 4,177,964, 4,219,171, 4,391,423, 4,588,150, 4,664,344, 4,898,348, 5,005,786, 5,040,749, 5,094,410, 5,299,764, 5,364,046, 5,372,340, 5,490,075, 5,511,748, 5,735,488, 5,803,407, 5,806,802, 6,017,000, 6,299,107, 6,330,987, 6,484,973, 6,523,784, 6,742,745, 6,843,446, 6,945,500, 6,969,030, 7,070,151, 7,104,505, 7,207,525, 7,216,833, 7,216,834, 7,240,879, 7,293,743, 7,370,834, 7,438,264, 7,461,818, 7,484,690, 7,513,459, 7,513,460, 7,575,199, 7,588,213, 7,611,096, 7,611,097, 7,624,950, 7,815,149, 7,823,837, 7,828,249, 7,857,261, 7,861,974, 7,861,975, 7,992,824, 8,006,937, 8,006,938, 8,016,242, 8,033,508, 8,056,864, 8,074,935, 8,181,911, 8,196,870, 8,205,838, 8,240,613, 8,245,370, 8,333,347, 8,412,391, 8,448,904, 8,899,527, 9,108,747, 9,302,793, 9,321,175, and 9,399,295; U.S. Patent Application Pub. Nos. 2004/0026571, 2006/0145024, 2006/0151671, 2007/0228220, 2009/0001221, 2012/0112009, 2012/0325972, 2013/0103193, 2015/0008290, 2015/0314893, 2016/0039543, and 2016/0039544; European Patent Nos. EP 0092602 A1, EP 0541052, 0741655 B1, 0741655 B2, and 1654159; PCT Pub. Nos. 2005/110847, 2005/118394, 2014/024,199, and 2016/030890; Japan Patent Nos. JPH01282098 and JPH01226497; *Automated Rendezvous and Docking of Spacecraft*, Fehse, Wigbert, Cambridge University Press (2003); *On-Orbit Servicing Missions: Challenges and Solutions for Spacecraft Operations*, Sellmaier, F., et al., SpaceOps 2010 Conference, AIAA 2010-2159 (2010); and *Towards a standardized grasping and refueling on-orbit servicing for geo spacecraft*, Medina, Alberto, et al., Acta Astronautica vol. 134, pp. 1-10 (2017); DEOS—The In-Flight Technology Demonstration of German's Robotics Approach to Dispose Malfunctioned Satellites, Reintsema, D., et al., the disclosure of each of which is hereby incorporated herein in its entirety by this reference.

However, mechanical complexity and/or active control complexity that is present in many of the above designs increases the likelihood of component failure, which can result in failure in the docking and maintenance process.

BRIEF SUMMARY

Some embodiments of the disclosure may include a vehicle capture assembly comprising a probe assembly including one or more retention elements for engaging with and securing a target vehicle and an extendable lance coupled to the probe assembly at a distal portion of the lance. The probe assembly may be configured to passively engage with and secure the target vehicle and to passively disengage from and release the target spacecraft.

Some embodiments of the disclosure may include a vehicle capture assembly comprising a probe assembly including one or more retention elements for engaging with and securing a target vehicle in a deployed position. The probe assembly may be configured to passively engage with and secure the target vehicle with the one or more retention elements in the deployed position. The vehicle capture assembly may include a biasing element for biasing the one or more retention elements in the deployed position. The one or more retention elements may be configured to be moved toward a stowed position against a force of the biasing element in response to a force applied to the one or more retention elements. The vehicle capture assembly may include an extendable lance coupled to the probe assembly where the probe assembly is positioned at a distal portion of the lance and an actuation element coupled to the one or more retention elements by one or more linkages. The actuation element may be for interacting with the biasing element to bias the one or more retention elements in the deployed position and to return the one or more retention elements to the deployed position after being forced into the stowed position.

Some embodiments of the disclosure may include a spacecraft capture system comprising two or more vehicle capture assemblies. The vehicle capture assemblies each include a probe assembly including one or more retention elements for engaging with and securing a target spacecraft and an extendable lance coupled to the probe assembly at a distal portion of the lance. The probe assembly is configured to engage with a portion of the target spacecraft. The two or more vehicle capture assemblies may be configured to substantially simultaneously retract each respective probe assembly of the two or more vehicle capture assemblies in order to secure the target spacecraft.

Some embodiments of the disclosure may include a method of capturing a spacecraft including extending a lance of a vehicle capture assembly toward a target spacecraft, passively engaging a probe of the vehicle capture assembly with the target spacecraft, the probe being coupled to the lance, retracting the lance of the vehicle capture assembly to at least partially secure the target spacecraft, and passively releasing one or more barbs of the probe from engagement with the target spacecraft.

Some embodiments of the disclosure may include a method of capturing a target spacecraft including biasing one or more barbs of a probe of a vehicle capture assembly in a deployed position with an actuation element coupled to the one or more barbs, inserting the one or more barbs into a docking element of the target spacecraft, at least partially retracting the one or more barbs to a retracted position in response to a force applied to the one or more barbs by the target spacecraft, moving the one or more barbs back to the deployed position to secure the one or more barbs to the docking element with the actuation element, moving the actuation element along the probe against a biasing force, and, in response to moving the actuation element, moving the one or more barbs to a release position in order to disengage the one or more barbs from the docking element of the target spacecraft.

Some embodiments of the disclosure may include one or more probe assemblies that are configured to be received in a respective structure (e.g., one or more capture cones) on a target vehicle. Retention features on the one or more probe assemblies may enable movement of the probe assembly to provide an approximate universal joint between the one or more probe assemblies and the target vehicle.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
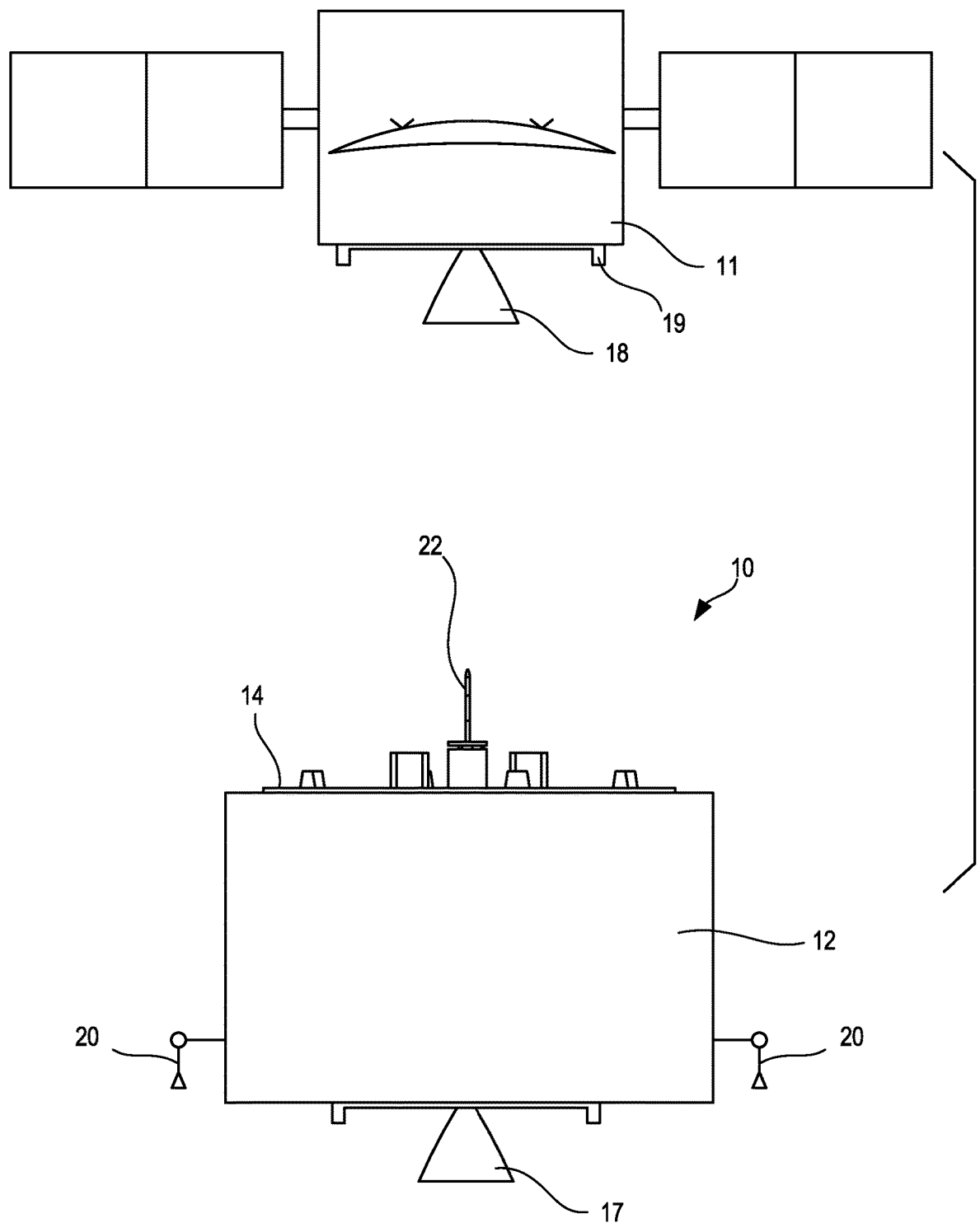
FIG. 1 is a schematic side view of a capture vehicle with a vehicle capture assembly and a target vehicle according to one or more embodiments of the disclosure.

While the disclosure is amenable to various modifications and alternate forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure.

DETAILED DESCRIPTION

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even 100% met.

Embodiments of the present disclosure may include capture and mating assemblies and systems used for mechanical docking of two or more vehicles (e.g., spacecraft in orbit, with or without self-propulsion), using one or more vehicle capture assemblies (e.g., two or more, three, four, etc.) on the capture vehicle. The vehicle capture assemblies are configured to engage with a docking portion of a target vehicle to be captured (e.g., one or more docking cones coupled to the target vehicle). Some embodiments may enable the autonomous capture and docking of spacecraft with relatively large mass and inertia, while incurring minimal disturbance to either vehicle. Some embodiments provide benefits in the form of a relatively simple docking architecture with compliancy for improved reliability and safety, that is, preventing damage to the spacecraft.

Some embodiments may reduce mechanical complexity of the docking apparatus by removing the need for an actively driven probe assembly for the docking process. For example, extension and/or retraction of retention elements of the probe assembly to capture and/or release the target vehicle may be effected substantially without the use of active components or device within the probe (e.g., a motor or other electronic and/or hydraulic actuation assemblies, such as a solenoid). Such embodiments may reduce or eliminate the need for electronic components (e.g., signal conductors, wiring, power systems, switches, etc.) in portions of the vehicle capture assembly (e.g., in a lance and/or probe of the vehicle capture assembly).

FIG. 1 depicts a schematic side view in which a capture vehicle 10 (e.g., a servicing vehicle, a chaser spacecraft, a transfer spacecraft, etc.) may be operated to approach, capture, dock to, supply, transfer cargo or resources to, and/or service a target vehicle 11, according to one or more embodiments of the disclosure.

Capture vehicle 10 and target vehicle 11 each may be a spacecraft or a satellite situated in orbit around a body. The capture vehicle 10 may be a spacecraft designed to approach, capture, dock to, and undock from the target vehicle 11. Docking of the capture vehicle 10 to target vehicle 11 may enable a specific function in a space mission. For example, the connection of the vehicles 10, 11 may enable the transfer of resources (e.g., cargo, equipment, passengers, crew, etc.) from one vehicle to another vehicle, may enable vehicle repair, and/or may enable a specific mission function (e.g., propulsion for a descent to or an ascent from an astronomical body or to transfer to a select location in space for the mission).

Capture vehicle 10 may be designed to dock with more than one target vehicle 11. For example, the capture vehicle 10 may be provided with a docking mechanism (e.g., vehicle capture assembly 22) that enables the capture vehicle 10 to dock and undock from multiple target vehicles 11. The capture vehicle 10 may be configured to dock with one or more of the target vehicles 11 comprising one or more docking elements 18 (e.g., a docking cone, an engine, etc.).

In some embodiments, and as discussed below, the docking element 18 may be configured to enable immediate release of the coupling between the vehicles 10, 11. For example, the docking element 18 may be coupled to the target vehicle 11 with a releasable coupling or union that may be destructively (e.g., with one or more pyrotechnic fasteners, such as explosive bolts) or nondestructively (e.g., with a releasable union) released from the target vehicle 11 in order to free at least a portion of the docking element 18.

As depicted, the capture vehicle 10 may include a spacecraft body 12, a docking platform 14, a main thruster 17, gimbaled thrusters 20, and the vehicle capture assembly 22. As noted above, the vehicle capture assembly 22 may include retention elements that directly contact and secure the target vehicle 11 in a manner that does not require the use of active components such as a motor directly actuating the retention elements (e.g., is not required to be driven in an active manner). Rather, the retention elements may use passive methodology or mechanisms, such as mechanical forces (e.g., biasing forces), to engage with the target vehicle 11.

Mechanical forces (e.g., biasing forces) may be used to release (e.g., nondestructively release) the retention elements to move the retention elements toward a stowed or disengaged position in order to release the target spacecraft 11 without the use of a motor directly driving the retention elements. Such embodiments may reduce, or even eliminate, the need for electronic components (e.g., signal conductors, electrical wiring, power systems, switches, motor, heaters, thermistors, helical harnesses, etc.) in portions of the vehicle capture assembly 22 (e.g., in a lance and/or probe of the vehicle capture assembly 22).

As discussed below, while a motor (e.g., only a single and solitary motor) may be used to actively move (e.g., translate) the vehicle capture assembly 22 toward and/or away from the target vehicle 11, such a motor may only indirectly contribute to the engagement and/or disengagement of the retention elements. For example, while the motor may place the retention elements in a selected position relative to the target vehicle, a force applied to the vehicle capture assembly 22 may be utilized to engage and/or disengage the retention elements (e.g., a force overcoming one or more biasing elements of the vehicle capture assembly 22) in a passive manner that is not actively driven by a motor or an otherwise electronic device.

Target vehicle 11 may be a spacecraft to be captured by the vehicle capture assembly 22 of the capture vehicle 10. Target vehicle 11 may be in low earth orbit, medium earth orbit, geosynchronous orbit, beyond geosynchronous orbit, or in another orbit around an astronomical body, for example, such as Earth, the moon, or another planetary body. Target vehicle 11 may include the docking element 18 and a separation ring 19.

Vehicle capture assembly 22 of capture vehicle 10 may be configured to capture target vehicle 11 at docking element 18 and to pull target vehicle 11 and capture vehicle 10 together for docking. When docked, one or more portions of the target vehicle 11 and/or vehicle capture assembly 22 may abut and retain the vehicles 10, 11 together.

Figure 2:
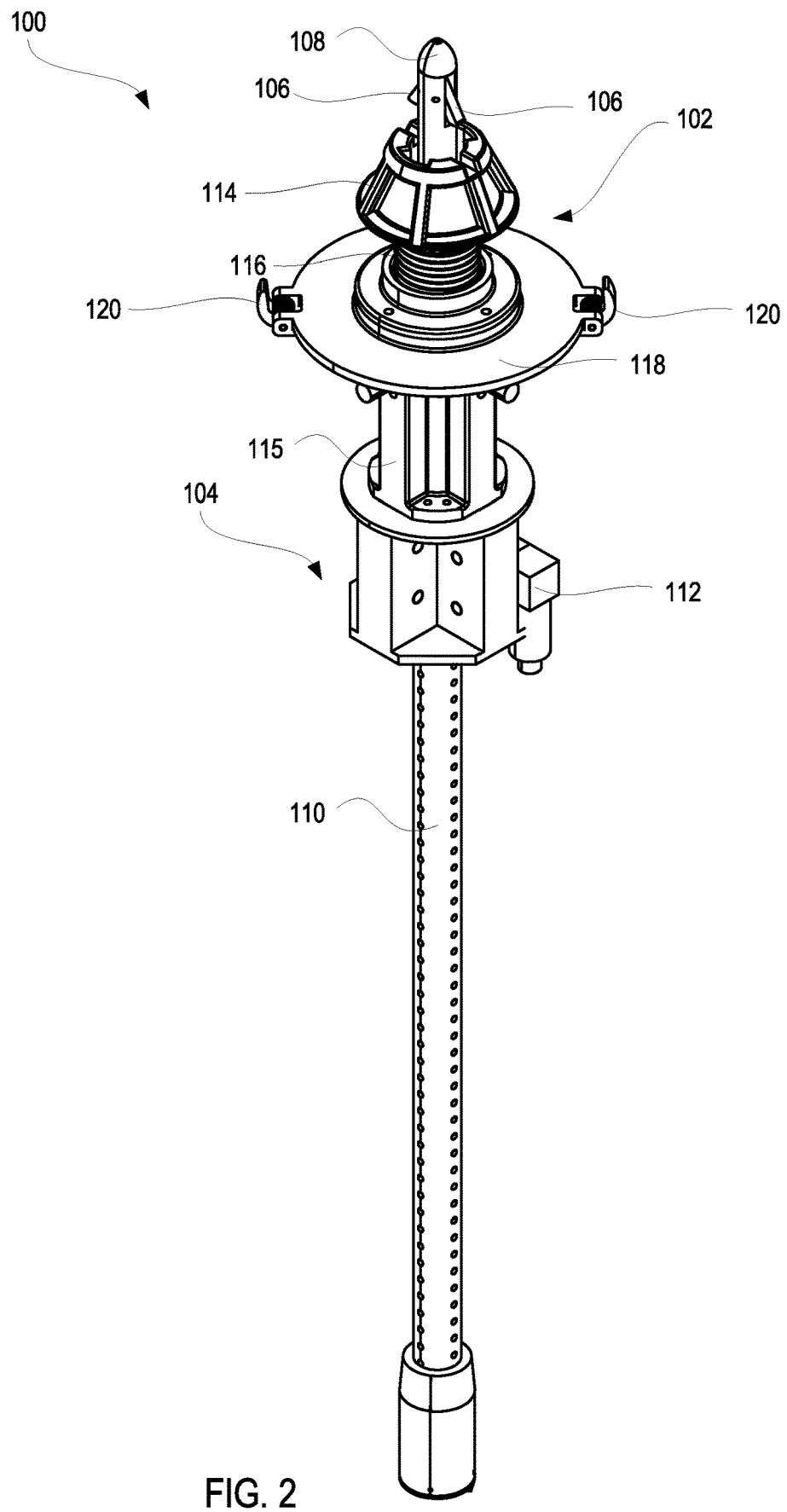
FIG. 2 is an isometric view of a vehicle capture assembly in an initial position according to one or more embodiments of the disclosure.

FIG. 2 depicts an isometric view of a vehicle capture assembly 100 in an initial position that may be used with a capture vehicle. In some embodiments, vehicle capture assembly 100 may be similar to, and include similar components and features of, the vehicle capture assembly 22 of the capture vehicle 10 which is depicted schematically in FIG. 1 and discussed above.

As shown in FIG. 2, the vehicle capture assembly 100 includes a probe or probe assembly 102 coupled to a lance or lance assembly 104 (e.g., at a distal portion of end of the lance assembly 104). The probe assembly 102 includes one or more retention features (e.g., barbs 106) that extend from the probe assembly 102 at a location proximate a probe tip 108. The barbs 106 may extend in a direction transverse to a length or longitudinal axis of one or more portions of the vehicle capture assembly 100 (e.g., lateral to a length of the lance assembly 104). As depicted, the rotatable barbs 106 extend laterally outward and in proximal direction toward the lance assembly 104 in order to capture a target vehicle 11 (FIG. 1).

In some embodiments, the barbs 106 may be biased (e.g., spring-loaded) in a selected position. For example, the barbs 106 may be in the depicted deployed position where the barbs 106 may couple with a portion of the target vehicle 11 (FIG. 1). In additional embodiments, the barbs 106 may be biased in a retracted or stowed position.

Referring to FIGS. 1 and 2, the lance assembly 104 may include functionality that enables extension and/or retraction of a portion of probe assembly 102 to facilitate docking of capture vehicle 10 with target vehicle 11. For example, when capture vehicle 10 is positioned proximate to the target vehicle 11, the probe assembly 102 may be extended to and inserted into the docking element 18 of the target vehicle 11 with the lance assembly 104. The lance assembly 104 may include a lance boom 110 that is driven by a motor 112 positioned in a housing 115 of the probe assembly 102. The motor 112 may be used to actively move (e.g., translate) the lance boom 110 toward and/or away from the target vehicle 11.

In some embodiments, the motor 112 may only indirectly contribute to the engagement and/or disengagement of the barbs 106. For example, while the motor 112 may place the barbs 106 in a selected position relative to the target vehicle 11, force applied to the barbs 106 (e.g., to overcome the biasing force of the barbs 106 into the deployed position) may be applied as the barbs 106 are inserted into the docking element 18 to engage the barbs 106 in a passive manner that is not actively driven by the motor 112. As discussed below, movement of the probe assembly 102 (e.g., by forcing the probe assembly 102 into the target vehicle 11) may be used to release the barbs 106 from the target vehicle 11 (e.g., by overcoming the biasing forces of the barbs 106 in a different manner with internal components of the probe assembly 102).

The vehicle capture assembly 100 may include another rearward element (e.g., docking cone 114) for engaging another portion of the target vehicle 11 (e.g., another portion of the docking element 18). As depicted, docking cone 114 may be biased toward the barbs 106 (e.g., by spring 116) in order to secure the target vehicle between the barbs 106 and the docking cone 114.

The vehicle capture assembly 100 may include a backstop plate 118 for mating with a portion of the target vehicle 11 (e.g., in the captured position). One or more additional retention elements (e.g., latches 120) may be coupled (e.g., rotatably coupled) to the backstop plate 118. Additional embodiments may include a linkage-type latch. In the captured position, the latches 120 may be actuated to engage with the docking element 18 to secure the target vehicle 11. In some embodiments, after engagement, the latches 120 may comprise a majority of the rigid connection between the vehicles 10, 11 (e.g., may be the primary connection). For example, the latches 120 may bear a majority of the forces developed between the two vehicles 10, 11 while the other attachment points (e.g., the docking cone 114 and/or the barbs 106) are not primarily used or experience a significantly lower amount of force (e.g., by one or more orders of magnitude).

Figure 3:
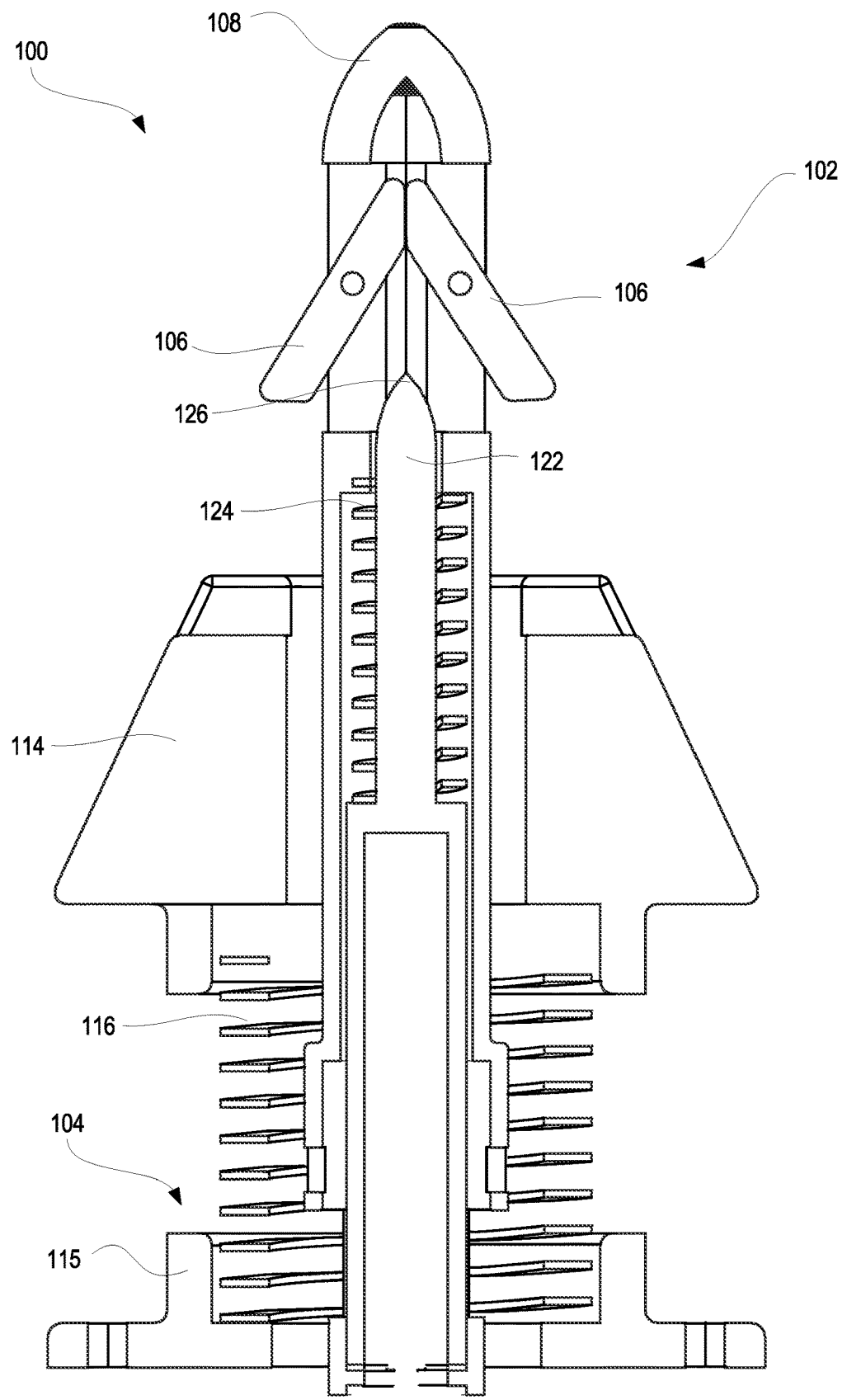
FIG. 3 is a partial cross-sectional side view of a vehicle capture assembly in an initial position according to one or more embodiments of the disclosure.

FIG. 3 is a partial cross-sectional side view of a vehicle capture assembly (e.g., vehicle capture assembly 100) in an initial position (e.g., after being initially deployed from a stowed state and before being extended toward the target vehicle 11 (FIG. 1)). As shown in FIG. 3, the vehicle capture assembly 100 includes an actuation feature (e.g., cam actuator 122) that may be coupled to the lance assembly 104 (e.g., at a distal end of the lance boom 110). The cam actuator 122 may move (e.g., translate) relative to one or more portions of the probe assembly 102 (e.g., the probe tip 108). For example, the cam actuator 122 may translate relative to (e.g., slide within) the probe tip 108. In some embodiments, the probe tip 108 may move relative to the overall vehicle capture assembly 100 while the cam actuator 122 is held stationary relative to one or more portions of the vehicle capture assembly 100 (e.g., the lance assembly 104).

A biasing element 124 (e.g., a spring) may be positioned between the cam actuator 122 and the probe tip 108 to bias the cam actuator 122 and/or the probe tip 108 in a selected position. For example, the biasing element 124 may bias the probe tip 108 in a position where the cam actuator 122 is separated from the barbs 106. When a force (e.g., force applied to the probe tip 108 between the vehicles 10, 11 (FIG. 1) overcomes the biasing element 124, the probe tip 108 may move relative to the cam actuator 122. A cam tip 126 of the cam actuator 122 may slide through the barbs 106 to move (e.g., rotate) the barbs 106 to another position (e.g., a stowed or released position). Once the force is removed from the probe tip 108, the biasing element 124 may return the probe tip 108 to an extended position where the barbs 106 may be returned to a deployed or capture position.

Figure 4:
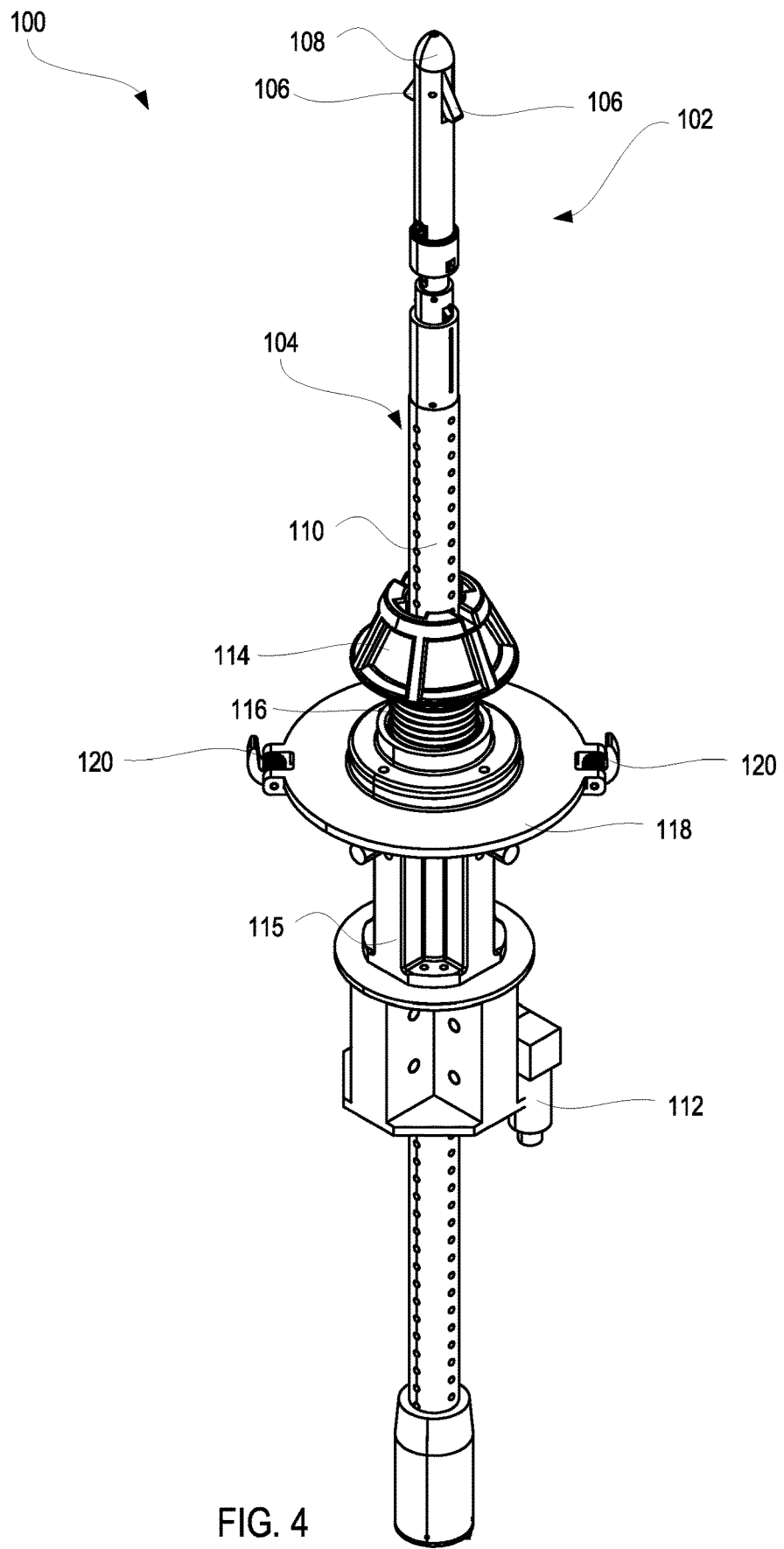
FIG. 4 is an isometric view of a vehicle capture assembly in an extended or extending position according to one or more embodiments of the disclosure.
Figure 5:
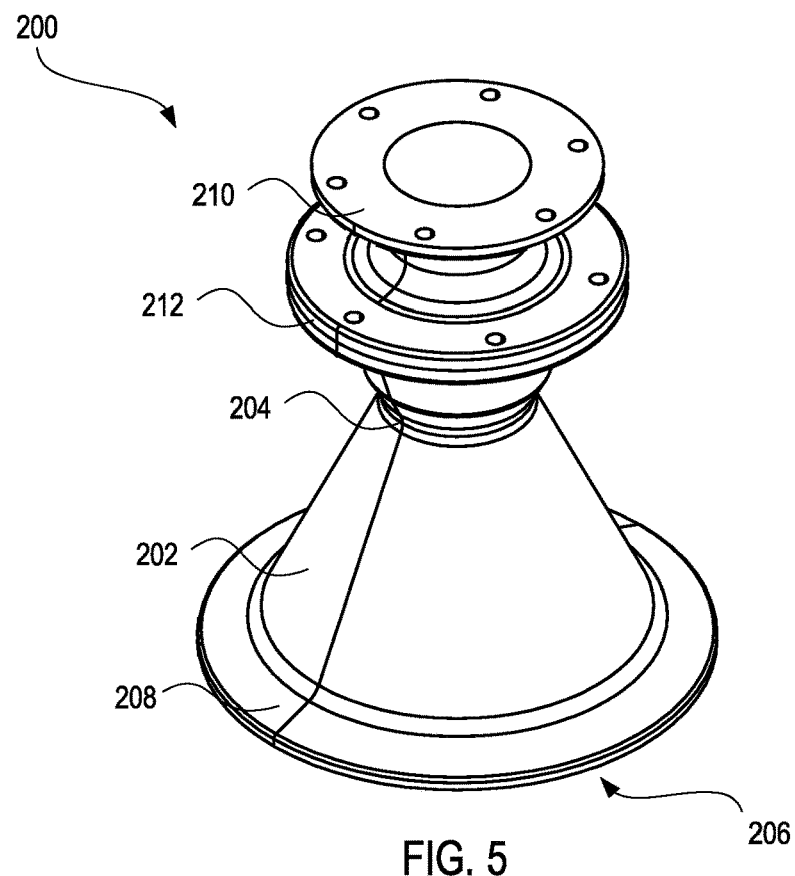
FIG. 5 is an isometric view of a docking assembly according to one or more embodiments of the disclosure.

FIG. 4 is an isometric view of a vehicle capture assembly (e.g., vehicle capture assembly 100) in an extended or extending position. FIG. 5 is an isometric view of a docking assembly 200 for a target vehicle 11 (FIG. 1).

Referring to FIG. 1 through 5, in operation, the vehicle capture assembly 100 may be positioned in the initial state shown in FIGS. 2 and 3. In some embodiments, the vehicle capture assembly 100 may move to the initial state from a stowed state (e.g., used during transport). In the stowed state, the probe tip 108 and barbs 106 may position (e.g., compress) the probe tip 108 and docking cone 114 toward or in contact with the backstop plate 118.

From the initial position, the lance motor 112 may translate the probe assembly 102 toward the target vehicle 11 (e.g., toward the docking assembly 200) to the extended or extending position shown in FIG. 4. The lance motor 112 and/or the capture vehicle 10 may move (e.g., force) the probe tip 108 through an outer cone 202 of the docking assembly 200, through a necked portion 204, and into an inner volume 206 of the docking assembly 200. As the probe tip 108 passes through the necked portion 204, biasing force of the barbs 106 may be overcome by the force of the insertion. The barbs 106 may at least partially retract to pass through the necked portion 204 and may be returned to a deployed or expanded position once in the inner volume 206 to initially capture the target vehicle 11.

In some embodiments, where multiple vehicle capture assemblies 100 are utilized (e.g., three vehicle capture assemblies 100), the combination of the vehicle capture assemblies 100 coupled to respective docking assemblies 18 of the target vehicle 11 may approximate a universal joint or rotational joint to provide for allowance and/or attenuation of movement and/or forces between the vehicles 10, 11. For example, both the barbs 106 (e.g., three barbs) and an inner portion the docking assembly 200 with which a distal end of the barbs 106 engage may comprise complementary surfaces. In some embodiments, both the barbs 106 and the inner portion of the docking assembly 200 may define at least partially spherical surfaces that enable the barbs 106 to move (e.g., slide along) an inner surface of the docking assembly 200 to provide the approximate universal joint.

In some embodiments, each docking assembly (e.g., three docking assemblies) may provide the combination of a universal joint, a prismatic joint, and an approximate universal joint (e.g., a 3-UPU (universal-prismatic-universal) manipulator) when coupled with a respective number of capture cones in space (e.g., in situ) during a docking procedure. In some embodiments, the 3-UPU may comprise combination of a universal joint, a prismatic joint, and an approximate universal joint, for example, a spherical joint.

After initial capture, the lance motor 112 may retract the probe assembly 102 back toward the capture vehicle 10. The lance motor 112 may force the docking cone 114 into contact with the docking assembly 200 (e.g., within the outer cone 202) to further secure the target vehicle 11. A rim 208 of the docking assembly 200 may be forced into the backstop plate 118. The latches 120 may be actuated to engage with the rim 208 of the docking assembly 200 to further secure the target vehicle 11 into a rigidized connection.

To release the target vehicle 11 in a nondestructive manner (e.g., a repeatable manner), the vehicle capture assembly 100 may release the docking assembly 200 and return to the initial position. For example, the lance motor 112 may extend the probe assembly 102 back away from the capture vehicle 10. As discussed above, force applied to the probe tip 108 may overcome the biasing element 124 and move the probe tip 108 relative to the cam actuator 122. The cam tip 126 of the cam actuator 122 may rotate the barbs 106 to release the docking assembly 200 and the probe tip 108 may be removed from the docking assembly 200. Once the force is removed from the probe tip 108, the biasing element 124 may return the probe tip 108 to the extended position where the barbs 106 may be returned to a deployed or capture position. The lance motor 112 may return the probe assembly 102 to the initial position similar to that shown in FIGS. 2 and 3.

To release the target vehicle 11 in another manner, one or more of the vehicle capture assembly 100 and/or the docking assembly 200 may include a destructively or nondestructively releasably union. For example, a coupling portion 210 may be coupled to the target vehicle 11 and releasably coupled to the remaining portion of the docking assembly 200 via a releasable union 212. In some embodiments, the releasable union 212 may include a pyrotechnic coupling (e.g., one or more exploding bolts) that may explosively release the docking assembly 200 from the target vehicle 11. In additional embodiments, the releasable union 212 may be a nondestructively releasable union (e.g., a remotely releasably electronic and/or magnetic latch or coupling).

Figure 6:
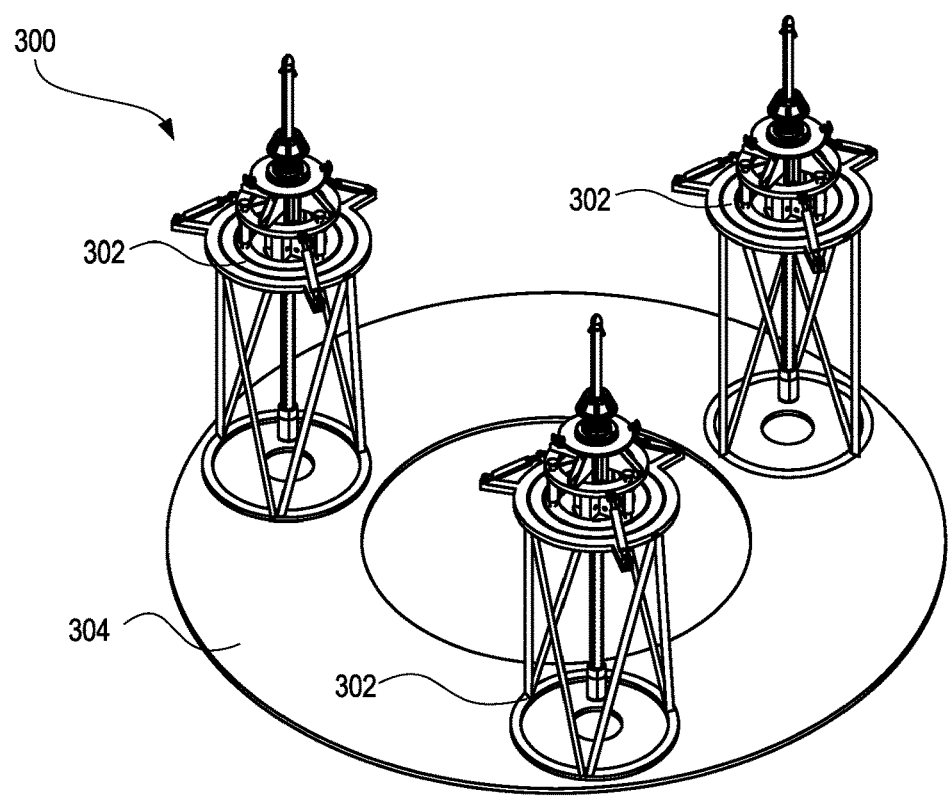
FIG. 6 is an isometric view of a vehicle capture system including multiple vehicle capture assemblies according to one or more embodiments of the disclosure.

FIG. 6 is an isometric view of a vehicle capture system 300 including multiple vehicle capture assemblies 302. In some embodiments, the multiple vehicle capture assemblies 302 may be similar to and include similar components of the vehicle capture assemblies discussed above.

As shown in FIG. 6, the vehicle capture assemblies 302 (e.g., three assemblies or arms) may be coupled in a staggered formation (e.g., in a ring) on a capture vehicle 304 (e.g., which may be similar to the capture vehicle 10 (FIG. 1)). As depicted, the vehicle capture assemblies 302 may be offset from a central portion or centerline of the capture vehicle 304. Such offset may provide clearance for propulsion systems or elements (e.g., primary engines) of the capture vehicle 304 and/or the target vehicle.

Two or more of the vehicle capture assemblies 302 may collectively (e.g., substantially simultaneously) dock with the target vehicle and draw and secure the target vehicle and capture vehicle 304 together by substantially simultaneously retracting each lance assembly of the vehicle capture assemblies 302. In some embodiments, the vehicle capture assemblies 302 may provide redundant docking connections in case of a misaligned or otherwise failed docking with one or more of the vehicle capture assemblies 302.

Figure 7:
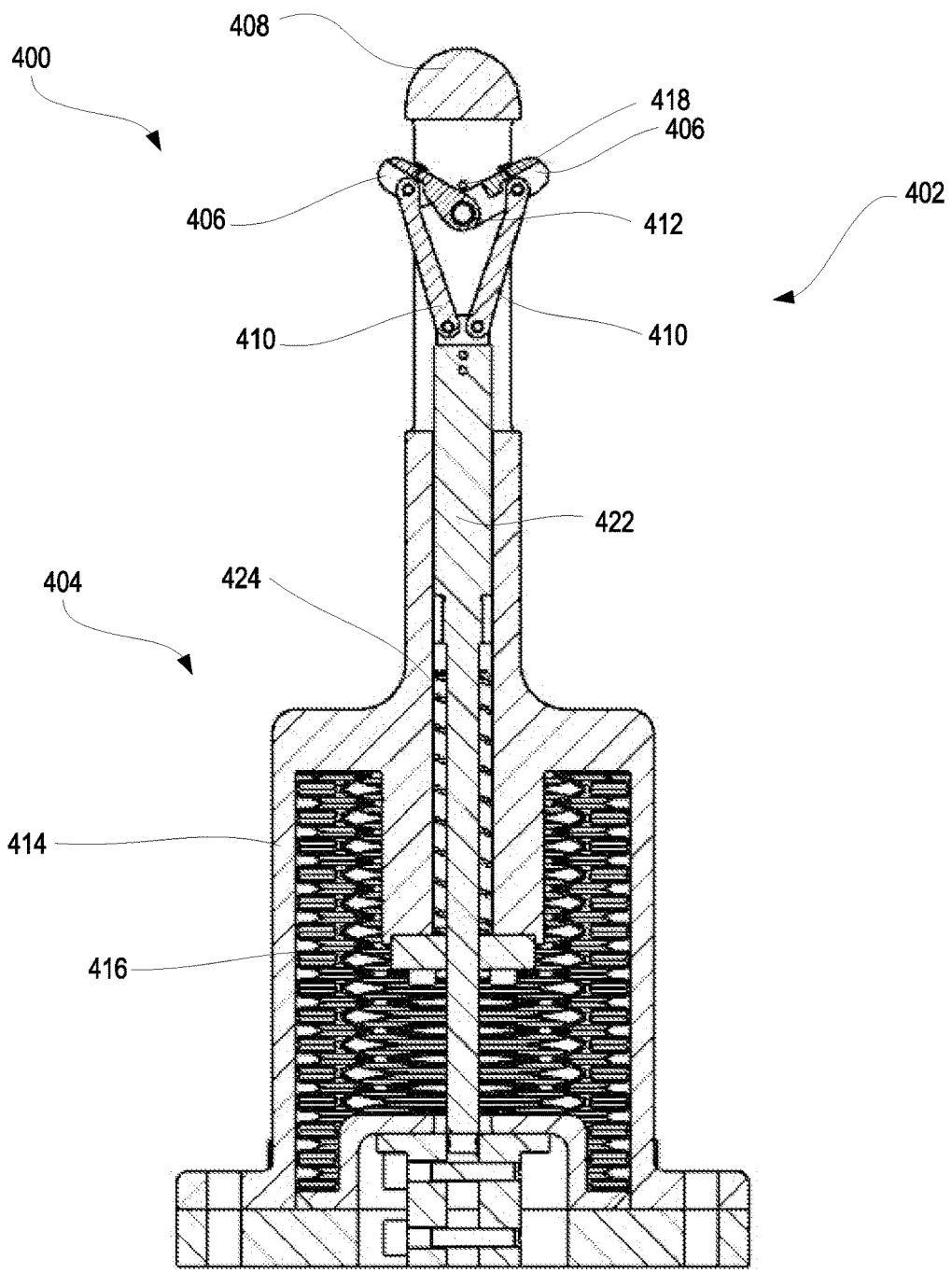
FIG. 7 is a partial cross-sectional side view of a vehicle capture assembly in an initial position according to one or more embodiments of the disclosure.

FIG. 7 is a partial cross-sectional side view of a vehicle capture assembly (e.g., vehicle capture assembly 400) in an extended position (e.g., an initial position and/or a deployed position). In some embodiments, the vehicle capture assembly 400 may be similar to and include one or more components of the vehicle capture assembly 100 discussed above.

As shown in FIG. 7, the vehicle capture assembly 400 includes an actuation feature (e.g., lanyard actuator 422) that may be coupled to and/or move within the lance assembly 404. The lanyard actuator 422 may move (e.g., translate) relative to one or more portions of the probe assembly 402 (e.g., the probe tip 408). For example, the lanyard actuator 422 may translate relative to (e.g., slide within) the probe tip 408. As depicted, the lanyard actuator 422 may be coupled to one or more barbs 406 (e.g., via linkages 410) in order to move the barbs 406 between extended and retracted positions (e.g., where each barb 406 is connected to a single, common lanyard actuator 422). For example, as the lanyard actuator 422 translates within the probe assembly 402, the lanyard actuator 422 may actuate the barbs 406 between positions. As depicted, the linkages 410 may be substantially J-shaped or L-shaped to provide leverage for rotating the barbs 406 and/or to provide adequate clearance for the lateral ends of the barbs 406.

In some embodiments, the one or more barbs 406 may be coupled together. For example, the one or more barbs 406 may be coupled by pin 412 where the barbs 406 may rotate relative to one another and relative to the probe tip 408. In some embodiments, the pin 412 may move (e.g., translate) within the probe tip 408 to enable the barbs 406 to rotate a selected amount (e.g., a selected range of degrees) in order to release and/or capture a target spacecraft. In additional embodiments, a portion of the probe tip 408 may move (e.g., translate) to enable the barbs 406 to rotate a selected amount in order to release and/or capture a target spacecraft.

In some embodiments, each of the barbs 406 may rotate (e.g., pivot) about a component of the probe tip 408 (e.g., one or more cam rollers 418). As noted above, where the pin 412 is implemented, movement of the pin 412 and/or movement of the cam rollers 418 (e.g., with the probe tip 408) may enable the rotation about of selected range of degrees. For example, the configuration may enable the barbs 406 to rotate 90 degrees to 180 degrees between retracted, extended, and overextended positions of each of the barbs 406, as discussed in further detail below.

As depicted, a biasing element 424 (e.g., a spring) may be positioned between the lanyard actuator 422 and the probe tip 408 to bias the lanyard actuator 422 and/or the probe tip 408 in a selected position. For example, the biasing element 424 may bias the probe tip 408 in a position where the lanyard actuator 422 positions the barbs 406 in an extended or deployed position with the linkages 410 (e.g., where the barbs 406 extend laterally from the probe tip 408 at a substantially maximum dimension or width). When a force (e.g., force applied to the barbs 406 during a docking or undocking procedure) overcomes the biasing element 424, the lanyard actuator 422 may move to compress and/or extend the biasing element 424 and, after the force is removed, the barbs 406 and lanyard actuator 422 may return to the initial state, as discussed below.

In some embodiments, the vehicle capture assembly 400 is coupled to a lance boom (e.g., the lance boom 110 (FIG. 4)) where extension (e.g., substantially full extension) of the lance boom toward a target spacecraft may act to pull the lanyard actuator 422 downward (e.g., against the biasing member 424) in order to retract the barbs 406. Such a configuration may enable retraction of the barbs 406 passively (e.g., without the direct use of a motor or other active device on the barbs or linkages coupled thereto). For example, the barbs 406 may be retracted passively using only the indirect motion of the lance boom, which may be driven by a motor, where the barbs 406 (or linkages coupled to the barbs 4060) are not directly driven by a motor or other active device.

In some embodiments, an end (e.g., a barb stow slider) of the lance boom that is movable relative to the length of the boom (e.g., and may be biased relative to the length of the lance boom) may be coupled to the lanyard actuator 422 by a component, such as a lanyard running through the lance boom. Once the lance boom approaches or substantially reaches the end of the stroke of the lance boom, the length of the lance boom may continue to move relative to the barb stow slider (e.g., against a biasing force). The barb stow slider may then act to pull the lanyard actuator 422 in the opposite direction of the lance boom movement in order to retract the barbs 406.

Similar to that discussed above, the vehicle capture assembly 400 may include another rearward engaging and/or retention element (e.g., docking cone 414) for engaging another portion of the target vehicle 11 (e.g., another portion of the docking element 18 (FIG. 1)). As depicted, docking cone 414 may be biased toward the barbs 406 (e.g., by spring 416) in order to secure the target vehicle between the barbs 406 and the docking cone 414.

Figure 8:
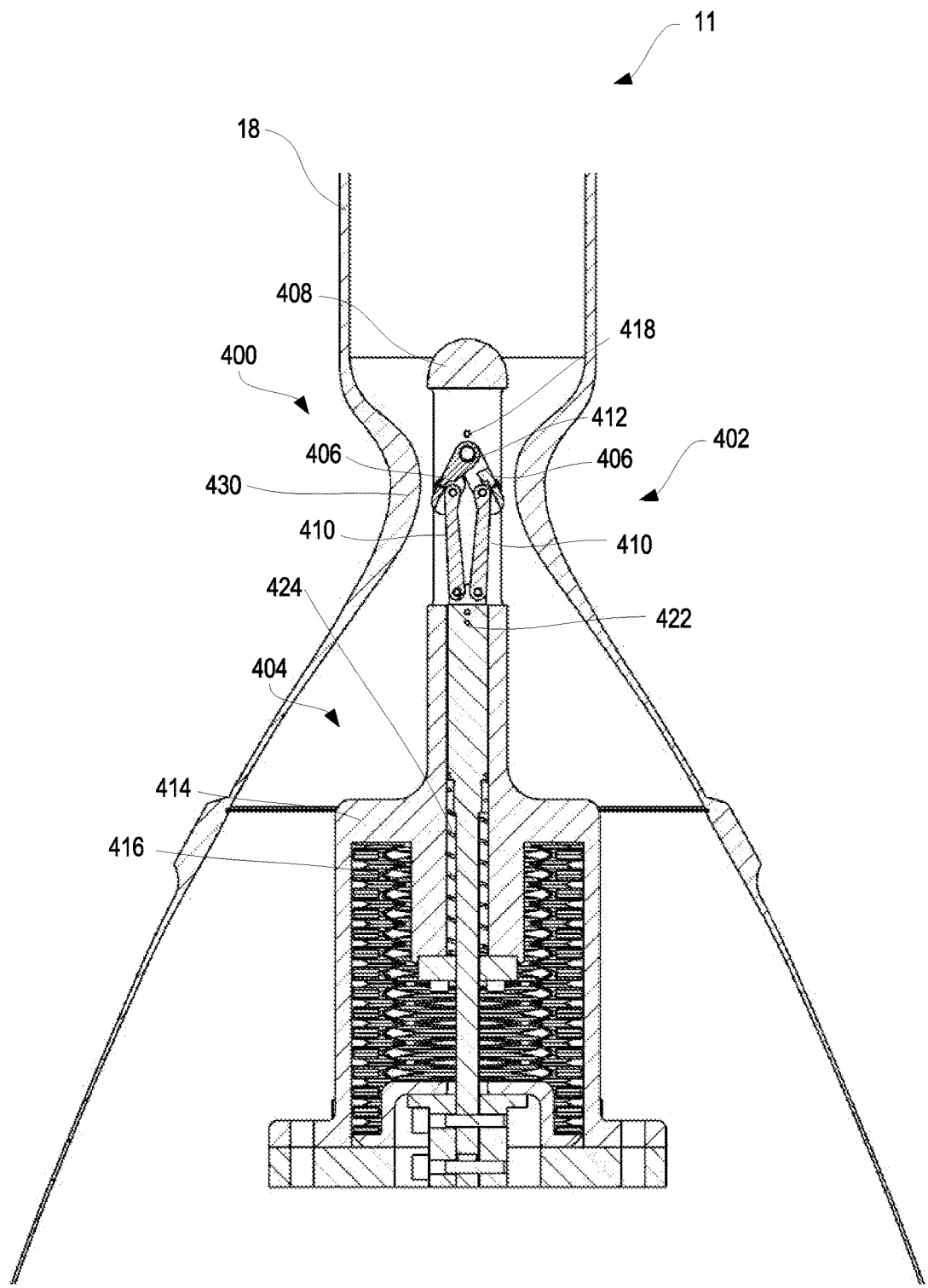
FIG. 8 is a partial cross-sectional side view of a vehicle capture assembly being received in a docking assembly according to one or more embodiments of the disclosure.
Figure 9:
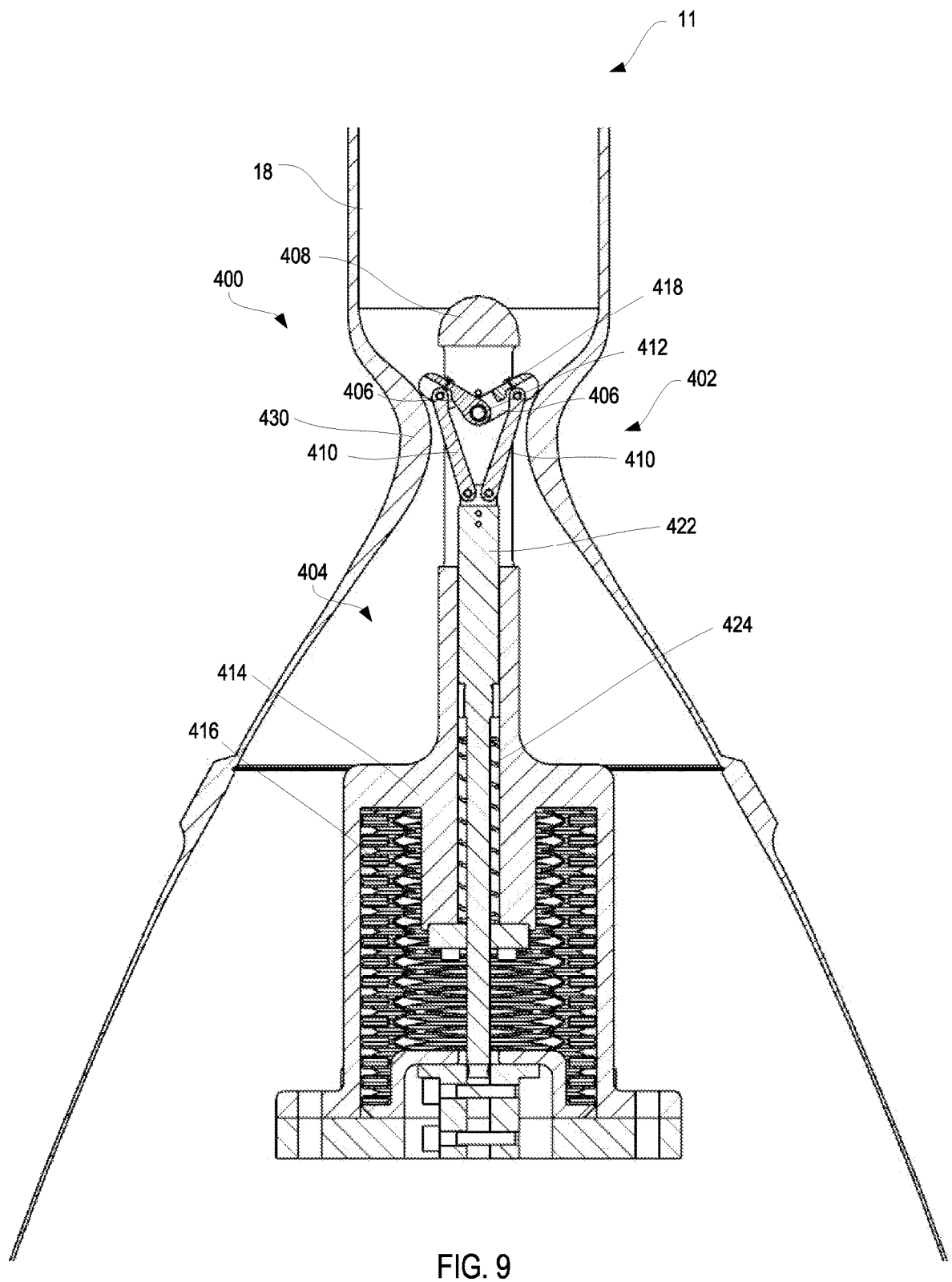
FIG. 9 is a partial cross-sectional side view of a vehicle capture assembly received in a docking assembly according to one or more embodiments of the disclosure.

FIGS. 8 and 9 show the vehicle capture assembly 400 in use (e.g., during a docking procedure). As shown in FIG. 8, during the docking procedure, a portion of the target spacecraft 11 (e.g., a throat 430 of a docking element 18) may force the barbs 406 into another position (e.g., the stowed or release position) from the initial position shown in FIG. 7 where the lateral width of the barbs 406 is decreased. With the barbs 406 at least partially retracted, the probe tip 408 and the barbs 406 may be positioned within the docking cone 414 and may travel past a necked portion of the docking element 18 (e.g., the throat 430). Once the force is removed from the probe tip 408, the biasing element 424 may return the probe tip 408 to an extended position where the barbs 406 may be returned to a deployed or capture position (e.g., in order to secure the target vehicle 11 via the docking element 18). This renewed deployed or capture position may be similar to the expended position shown in FIG. 7 that creates a maximum lateral span of the barbs 406. In the deployed or capture position, the barbs 406 may secure the vehicle capture assembly 400 to the docking element 18 of the target vehicle 11 (e.g., where the barbs 406 prevent travel of the probe tip 408 back through the throat 430).

As shown in FIG. 9, after or during the docking procedure, the barbs 406 may be capable of moving to yet another release position to release the docking element 18. Such an additional release position may be utilized to free the target vehicle 11 by releasing the docking element 18 from the probe tip 408 during an undocking procedure or during an unsuccessful or partial docking procedure. As depicted, the docking element 18 (e.g., the throat 430) may force the barbs 406 into the additional release position (e.g., a forward or overextended position where the barbs 406 are pointed toward the docking element 18 and/or a distal end of the probe tip 408). For example, relative movement between the vehicle capture assembly 400 and the target vehicle 11 may again force the barbs 406 into the surfaces of the docking element 18 defining the throat 430.

In some embodiments, in order to move to the forward position, the barbs 406 may pivot against the cam rollers 418 and the pin 412 may move away from the cam rollers 418 to enable the barbs 406 to retract into the forward position as shown in FIG. 9. As discussed above, the pin 412 and/or the cam rollers 418 (e.g., via movement of the probe tip 408) may translate to enable this rotation of the barbs 406.

In the forward position, the docking element 18 may be released from the barbs 406 as the lateral width of the barbs 406 is decreased as the barbs 406 rotate forward. As noted above, such a release may be utilized when during an undocking procedure or when a docking procedure is unsuccessful, enabling the target vehicle 11 to be released.

In some embodiments, the amount of force required to move the barbs 406 to the forward position, may be selected to be greater than an expected range of forces experience during a normal docking procedure and may be greater than the force required to move the barbs 406 to the retracted position. For example, about 25 pounds of force (about 111.2 N) may be required to move the barbs 406 to the forward position and 2 pounds of force (about 8.9 N) may be required to move the barbs 406 to the retracted position. In such an embodiment, creating the relatively larger force between the vehicle capture assembly 400 and the target vehicle 11 may enable a passive undocking or release procedure between the vehicle capture assembly 400 and the target vehicle 11.

As noted above, the barbs 406 may rotate up to 180 degrees from the retracted position or up to 90 degrees from the extended position in the forward position.

Once the force is removed from the probe tip 408, the probe tip 408 may return the barbs 406 to the extended position from the overextended position where the barbs 406 may be returned to the deployed or capture position (e.g., in order to again secure the target vehicle 11 or another vehicle). In some embodiments, the biasing element 424 and the lanyard actuator 422 may act to force the barbs 406 back to the initial position or another biasing or force feature may be utilized to return the barbs 406 from the overextended position.

As discussed above, the movement of the barbs 406 may be accomplished passively, for example, where biasing forces from one or more biasing features are overcome to move the barbs 406 to either the retracted or forward positions. The biasing forces may also be used to return the barbs 406 into the initial position in the event the barbs 406 are moved (e.g., rotated) by another force. In additional embodiments, the movement of the barbs 406 may be accomplished by actively driving the barbs 406 (e.g., via the lanyard actuator 422 and/or linkages 410) between one or more of the retracted or forwarded positions (e.g., via a motor of the vehicle capture assembly 400).

In some embodiments, and similar to that discussed above, a force applied to the probe tip 408 may move the barbs 406 and the lanyard actuator 422 such that the barbs 406 release the docking assembly 18. For example, a force applied to the probe tip 408 may force the probe tip 408 into the barbs 406. In response, the barbs 406 (e.g., under the biasing force applied by the lanyard actuator 422) may be rotated into the forward position such as that shown in FIG. 9 in order to release the docking element 18.

The embodiments of the disclosure described above and illustrated in the accompanying drawing figures do not limit the scope of the disclosure, since these embodiments are merely examples of embodiments of the disclosure. The disclosure is defined by the appended claims and their legal equivalents. Any equivalent embodiments lie within the scope of this disclosure. Indeed, various modifications of the present disclosure, in addition to those shown and described herein, such as alternative useful combinations of the elements described, will become apparent to those of ordinary skill in the art from the description. Such modifications and embodiments also fall within the scope of the appended claims and their legal equivalents. The terminology used herein was chosen to explain the principles of the embodiments, the practical application or technical improvement over technologies found in the marketplace, or to enable others of ordinary skill in the art to understand the embodiments disclosed herein.

What is claimed is:

1. A vehicle capture assembly, comprising:
 a probe assembly including one or more retention elements for engaging with and securing a target vehicle in a deployed position; and
 an extendable lance coupled to the probe assembly, the probe assembly being positioned at a distal portion of the lance;
 wherein the probe assembly is configured to passively engage with and secure the target vehicle and to passively disengage from and release the target vehicle; and
 wherein the one or more retention elements are configured to move past the deployed position in a direction toward the target vehicle to an overextended position where the one or more retention elements release the target vehicle.

2. The vehicle capture assembly of claim 1, wherein the probe assembly is configured to passively engage with and secure the target vehicle and to passively disengage from and release the target vehicle without use of a motor.

3. The vehicle capture assembly of claim 1, wherein the one or more retention elements comprises one or more barbs extending from the probe assembly in a direction transverse from a length of the lance, the one or more barbs configured to be at least one of passively stowed or passively deployed.

4. The vehicle capture assembly of claim 3, wherein the one or more barbs are biased in a deployed position, and wherein the one or more barbs are configured to be moved toward a stowed position in response to a force applied to a portion of the probe assembly.

5. The vehicle capture assembly of claim 4, wherein the force applied to a distal end of the probe assembly or applied to the one or more barbs is configured to move the one or more barbs toward the stowed position.

6. The vehicle capture assembly of claim 1, wherein the probe assembly comprises another retention element spaced from the one or more retention elements along a length of the vehicle capture assembly.

7. The vehicle capture assembly of claim 6, wherein both the another retention element and the one or more retention elements are configured to engage with and secure the target vehicle without use of any actively driven components.

8. The vehicle capture assembly of claim 1, wherein the probe assembly lacks at least one of motors, electrical components, electrical wiring, switches, heaters, thermistors, helical harnesses, or electrical signal conductors.

9. The vehicle capture assembly of claim 1, further comprising a motor configured to translate the probe assembly and the lance toward and away from the target vehicle.

10. The vehicle capture assembly of claim 9, wherein translation of the probe assembly and the lance at least one of passively stows or passively deploys the one or more retention elements without being directly driven by the motor.

11. The vehicle capture assembly of claim 1, further comprising at least one clamp configured to engage with a docking cone of the target vehicle after the target vehicle has been secured by the probe assembly.

12. The vehicle capture assembly of claim 11, wherein, after engagement, the at least one clamp comprises a primary connection between the target vehicle and the vehicle capture assembly.

13. The vehicle capture assembly of claim 1, wherein the vehicle capture assembly comprises two or more capture arms, each of the two or more capture arms comprising a respective combination of a probe assembly and an extendable lance that is at least partially independent from the probe assembly and the extendable lance of another capture arm of the two or more capture arms.

14. The vehicle capture assembly of claim 13, wherein the two or more capture arms are each configured to be mounted at a location on a capture vehicle that is offset from a centerline of the capture vehicle and from primary propulsion devices of the capture vehicle.

15. The vehicle capture assembly of claim 1, further comprising:;
a biasing element for biasing the one or more retention elements in the deployed position, the one or more retention elements configured to be moved toward a stowed position against a force of the biasing element in response to a force applied to the one or more retention elements; and
an actuation element coupled to the one or more retention elements by one or more linkages, the actuation element for interacting with the biasing element to bias the one or more retention elements in the deployed position and to return the one or more retention elements to the deployed position after being forced into the stowed position.

16. The vehicle capture assembly of claim 15, wherein translation of the actuation element away from the one or more retention elements is configured to move the one or more retention elements into the stowed position in order to release the target vehicle.

17. The vehicle capture assembly of claim 15, wherein the one or more retention elements are configured to move past the deployed position and away from the stowed position in a direction toward the target vehicle to an overextended position where the one or more retention elements release the target vehicle.

18. The vehicle capture assembly of claim 15, wherein translation of the lance in a direction toward the target vehicle is configured to move the one or more retention elements into the stowed position in order to release the target vehicle.

19. A spacecraft capture system, comprising:
two or more vehicle capture assemblies, each comprising the vehicle capture assembly of claim 1,
wherein the two or more vehicle capture assemblies are configured to substantially simultaneously retract each respective probe assembly of the two or more vehicle capture assemblies in order to secure the target vehicle.

20. The spacecraft capture system of claim 19, wherein each of the two or more vehicle capture assemblies are configured to substantially define a universal joint between the target vehicle and the capture system when the probe assembly of each of the two or more vehicle capture assemblies is received in and engaged with a respective docking cone of the target vehicle.

21. A vehicle capture assembly, comprising:
a probe assembly including one or more retention elements for engaging with and securing a target vehicle in a deployed position; and
an extendable lance coupled to the probe assembly, the probe assembly being positioned at a distal portion of the lance;
wherein the probe assembly is configured to passively engage with and secure the target vehicle and to passively disengage from and release the target vehicle;
wherein the one or more retention elements comprises one or more barbs extending from the probe assembly in a direction transverse from a length of the lance, the one or more barbs configured to be at least one of passively stowed or passively deployed;
wherein the one or more barbs are biased in a deployed position, and wherein the one or more barbs are configured to be moved toward a stowed position in response to a force applied to a portion of the probe assembly; and
wherein the one or more barbs are configured to move past the deployed position and away from the stowed position in a direction toward the target vehicle to an overextended position where the one or more barbs release the target vehicle.

22. The vehicle capture assembly of claim 21, wherein the one or more barbs are coupled to an actuation element by one or more linkages, the actuation element for interacting with a biasing element to bias the one or more barbs in the deployed position and to return the one or more barbs the deployed position after being forced into one or more of the stowed position or the overextended position.

23. The vehicle capture assembly of claim 21, wherein the one or more barbs are configured to exhibit a substantially maximum lateral width in the deployed position and a reduced lateral width relative to the maximum lateral width in both the stowed position and the overextended position.

24. A method of capturing a spacecraft, the method comprising:
extending a lance of a vehicle capture assembly toward a target spacecraft;
passively engaging a probe of the vehicle capture assembly with the target spacecraft, the probe being coupled to the lance;

retracting the lance of the vehicle capture assembly to at least partially secure the target spacecraft;

passively releasing one or more barbs of the probe from engagement with the target spacecraft in a deployed position; and extending the lance and the target spacecraft away from a capture vehicle, and wherein passively releasing the one or more barbs of the probe comprises nondestructively releasing the target spacecraft.

25. The method of claim 24, wherein passively releasing the one or more barbs of the probe comprises rotating the one or more barbs past the deployed position in a direction toward the target spacecraft.

26. The method of claim 24, further comprising biasing the one or more barbs in a deployed position, and wherein passively releasing the one or more barbs of the probe comprises retracting the one or more barbs toward a stowed position in order to release the target spacecraft by extending the lance.

27. The method of claim 24, wherein passively releasing the one or more barbs of the probe comprises moving the one or more barbs past the deployed position to a forward position in a direction toward the target spacecraft with a force applied to the one or more barbs by the target spacecraft.

28. A method of capturing a spacecraft, the method comprising:

extending a lance of a vehicle capture assembly toward a target spacecraft:

passively engaging a probe of the vehicle capture assembly with the target spacecraft, the probe being coupled to the lance;

retracting the lance of the vehicle capture assembly to at least partially secure the target spacecraft;

passively releasing one or more barbs of the probe from engagement with the target spacecraft in a deployed position; and destructively releasing the target spacecraft by detonating one or more explosive unions to disengage the target spacecraft from the probe.

29. A vehicle capture assembly, comprising:

a probe assembly including one or more barbs for engaging with and securing a target vehicle; and an extendable lance coupled to the probe assembly, the probe assembly being positioned at a distal portion of the lance;

wherein the probe assembly is configured to passively engage with and secure the target vehicle and to passively disengage from and release the target vehicle; and wherein the one or more barbs extend from the probe assembly in a direction transverse to a length of the lance, the one or more barbs configured to rotate relative to the probe assembly to move between a deployed position and a stowed position, the one or more barbs configured to be at least one of passively stowed in the stowed position or passively deployed in the deployed position.

30. The vehicle capture assembly of claim 29, wherein the one or more barbs are configured to move past the deployed position in a direction toward the target vehicle to an overextended position where the one or more barbs release the target vehicle.

31. The vehicle capture assembly of claim 29, wherein the one or more barbs are biased in the deployed position.

* * * * *